Jan. 3, 1933.  L. S. HAMER  1,892,835
STOPCOCK
Filed Oct. 30, 1929   2 Sheets-Sheet 1
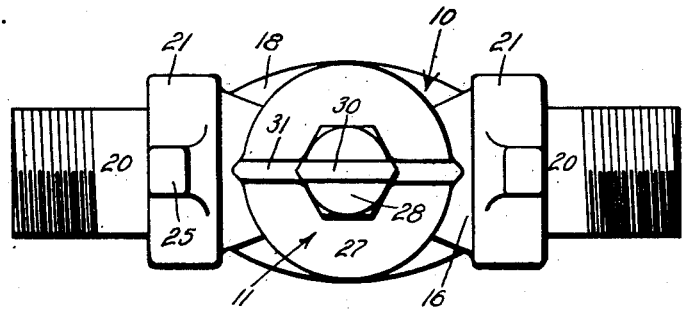
Fig 1.
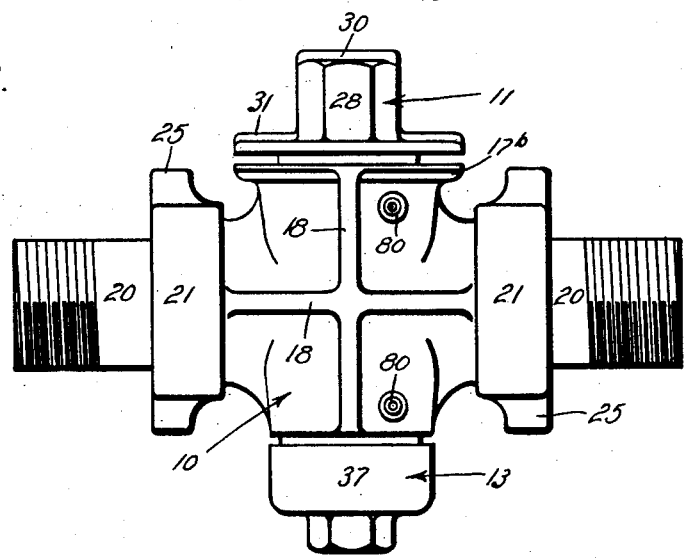
Fig 2.
Fig 3.
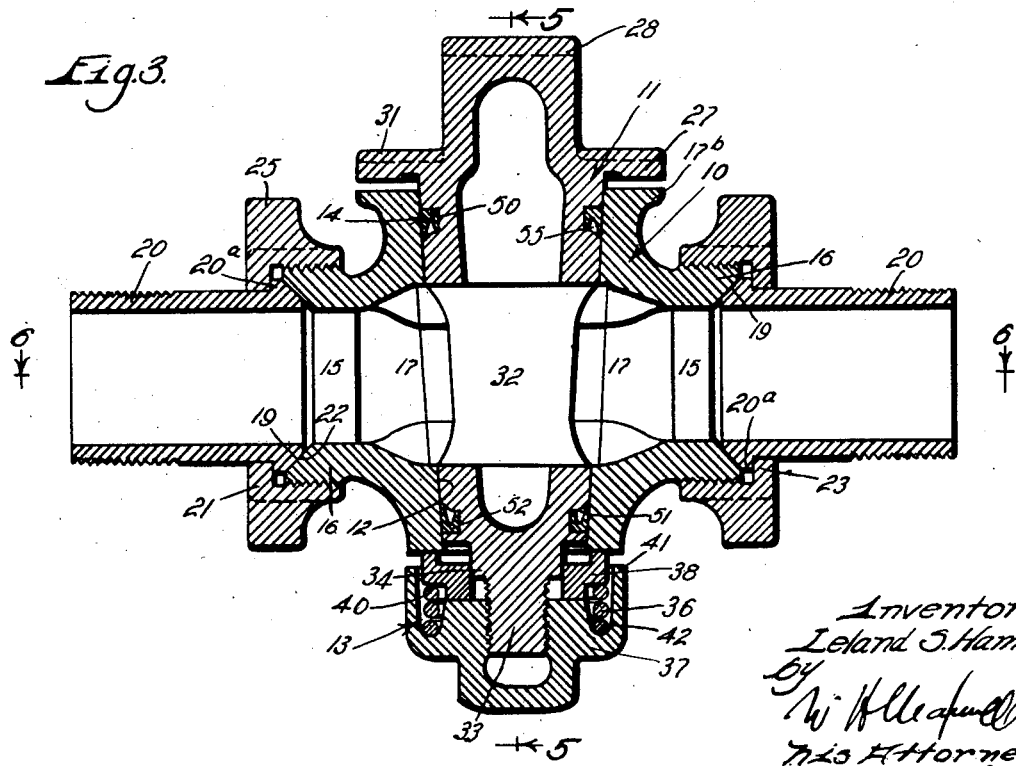
Inventor
Leland S. Hamer
By
His Attorney

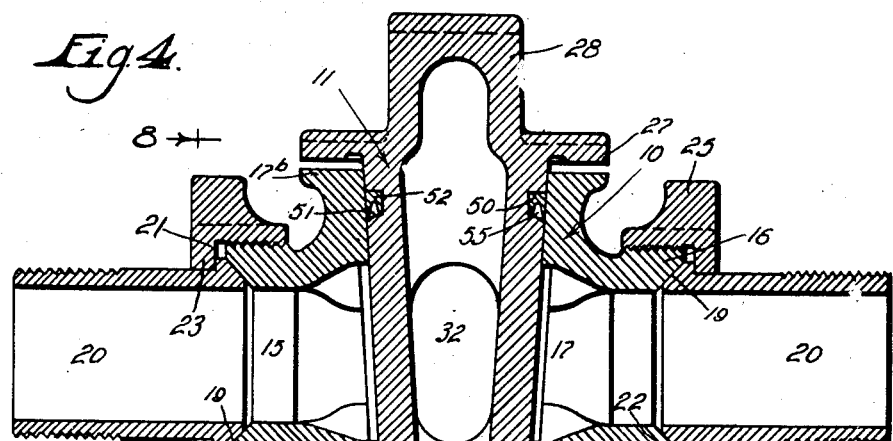
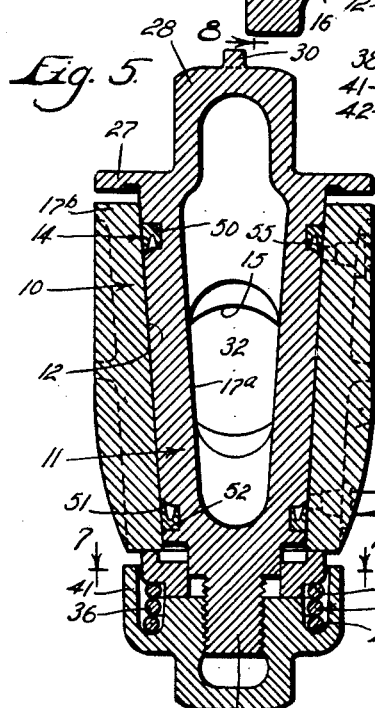
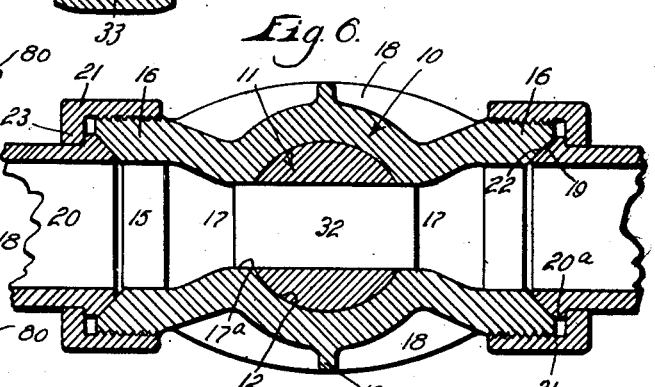
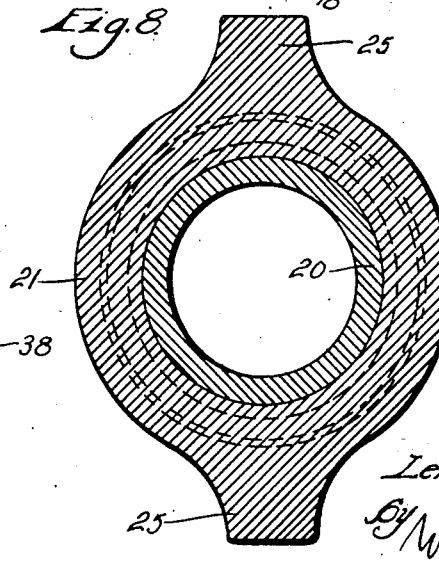

Patented Jan. 3, 1933

1,892,835

UNITED STATES PATENT OFFICE

LELAND S. HAMER, OF LONG BEACH, CALIFORNIA

STOPCOCK

Application filed October 30, 1929. Serial No. 403,441.

This invention relates to a valve device and relates more particularly to a stop cock. It is a general object of the invention to provide a stop cock that is particularly adapted to handle fluids under high pressures.

Considerable difficulty has been encountered in providing a stop cock that is suitable for use on pipe lines or conduits handling fluid under high pressures. The common forms of stop cocks are not practical or effective on conduits handling fluid containing solid matter; for instance, on slush pump manifolds, headers, or the like, passing rotary mud used in well drilling. The stop cocks employed in such situations must be of extremely sturdy construction as the cores or plugs are often struck to loosen them before being operated or turned. Further, the usual stop cocks soon leak or cut out around the plugs and when the plugs are loosened prior to being operated, the mud or fluid squirts or discharges from around the plugs into the face and eyes of the operator.

It is an object of the invention to provide a stop cock that is particularly suited for use in handling fluid containing solid matter, such as rotary mud, at high pressures.

Another object of the invention is to provide a stop cock of the character mentioned that is formed so that it does not materially retard the flow of fluid when open.

Another object of the invention is to provide a stop cock that is constructed so as to be fluid tight at all times under extreme pressures, the plug being retained in the body so that it is yieldingly urged into tight seating engagement with the body, even, when operated or turned.

Another object of the invention is to provide a stop cock that embodies a flange or shield on the plug to prevent fluid from discharging upon the operator in the event of leakage.

Another object of the invention is to provide a stop cock that is particularly sturdy and strong; having protecting or reinforcing parts on both the plug and body.

Another object of the invention is to provide a stop cock that embodies special packing means that operates to prevent leakage around the plug.

A further object of the invention is to provide a stop cock that is formed so as to be quickly and effectively mounted or inserted in a pipe line.

Other objects and features of my invention will be best and more fully understood from the following detailed description of a typical form and application of the invention, throughout which description reference is had to the accompanying drawings, in which:

Fig. 1 is a top or plan view of the stop cock provided by this invention. Fig. 2 is a side elevation of the stop cock. Fig. 3 is an enlarged vertical detailed sectional view of the stop cock showing it open. Fig. 4 is a view similar to Fig. 3, showing the stop cock in the closed position. Fig. 5 is a vertical detailed sectional view taken as indicated by line 5—5 on Fig. 3. Fig. 6 is a horizontal detailed sectional view taken as indicated by line 6—6 on Fig. 3. Fig. 7 is an enlarged horizontal detailed sectional view taken as indicated by line 7—7 on Fig. 5, and Fig. 8 is an enlarged vertical detailed sectional view taken as indicated by line 8—8 on Fig. 4.

The stop cock provided by this invention is particularly suited for use in connection with a slush pump or for use in the circulation line of a well drilling rig. The device is, however, adapted for various other uses where high pressures are encountered. The invention, therefore, is not to be considered as limited or restricted to the application above referred to, but is to be taken as including any features or applications that may fall within the scope of the claims.

The stop cock provided by this invention includes, generally, a body 10, a core or plug 11 seating at a tapered opening 12 in the body and operable to prevent the passage of fluid through the body, means 13 normally yieldingly urging the plug 11 into seating engagement with the walls of the opening 12, and sealing means 14 operating to prevent the leakage or passage of fluid between the plug and the walls of the opening 12.

The body 10 is preferably strongly constructed to withstand the hard usage to which it may be subjected at a well rig, or the like. The body 10 is provided with a fluid passage 15 extending completely through it. Passage 15 preferably extends diametrically through the body so that it opens at opposite sides of the body. In accordance with the invention, outwardly projecting parts 16 are provided on the opposite sides of the body 10 around the passage 15. The end portions of the passage 15 are preferably of round cross section, while the central or middle portion 17 of the passage is of oval or elongated cross section. The central portion 17 of the passage 15 is elongated vertically or extends in the direction of the plug opening 12 and the sides 17$^a$ are pitched or inclined so that they are parallel with the pitch or taper of the plug. With this formation the opening is narrower or smaller at what I will term the lower end, than it is at the upper end. The upper and lower walls of the central portion 17 of the passage are curved or rounded, as clearly illustrated in the drawings.

The plug opening 12 extends completely through the body 10 and extends transversely of the passage 15. The opening 12 is of round cross sectional configuration and is tapered inwardly and downwardly. The taper or inclination of the walls of the opening 12 is preferably uniform throughout the length of the opening. The end of the body 10 around the lower end of the opening 12 is preferably made flat and at right angles to the axis of the opening. The upper end of the body 10 around the opening 12 is provided with an outwardly projecting radial flange 17$^b$. The upper or outer end of the flange 17$^b$ is preferably flat.

The exterior of the body 10 is provided with strengthening or reinforcing ribs 18. It is preferred that the ribs 18 extend in both directions and be provided on both sides of the body.

In the preferred form of the invention the body 10 is constructed or formed so that it may be effectively and quickly installed in a pipe line. In the preferred form of the invention the projecting parts 16 are provided at their outer ends with tapered seats 19. The seats 19 taper outwardly from the ends of the passage 15. In the particular form of the invention illustrated in the drawings, a sub or nipple 20 is attached to each of the parts 16 by a nut or union part 21. The nipples 20 are provided at their ends with beveled or tapered seating faces 22 which fit the seats 19. A small radial flange 20$^a$ is provided on the exterior of each of the nipples 20 adjacent the faces 22. The nuts 21 are screw threaded on the parts 16 and are provided with inwardly extending flanges 23 to engage the flanges 20$^a$ of the nipples. The nuts 21 may be provided with projecting wings 25 adapted to be struck or engaged for turning on the parts 16. The projecting portions of the nipples 21 may be externally screw threaded to receive a coupling, or like part.

The plug 11 is an elongated part of round cross section and it is formed to operate in the opening 12. The plug 11 is longitudinally tapered to uniformly seat in the opening 12. The plug 11 is preferably longer than the opening 12 so that it projects a short distance above the upper end of the body. A shield in the form of a flange 27 projects radially outward from the plug 11 above the upper end of the body 10. The flange 27 may be of substantially the same size or diameter as the flange 17$^b$ of the body and is adapted to cooperate with the flange 17$^b$ to limit the downward movement of the plug 11 in the body. The upper end part 28 of the plug 11 above the flange 27 is preferably made polygonal so that it is adapted to be engaged by a wrench or suitable tool for operating or turning the plug. A protecting or reinforcing rib 30 may be provided on the part 28 and a like rib 31 may be formed on the upper side of the flange 27. The plug 11 is preferably hollow so that the head or upper end part 28 is in the form of a dome. It is preferred to form the plug with comparatively heavy walls, as shown in the drawings.

A transverse opening 32 is provided in the plug 11 of the same shape and size as the central portion 17 of the passage 15. The opening 32 is located so as to normally be in register with the portion 17 of the passage when the stop cock is open. The lower end of the plug 11 is provided with an outwardly or downwardly projecting stem 33. The stem 33 is preferably concentric to the opening 12 and has a base portion 34 at the end of the plug 11. The base 34 is preferably polygonal or is provided with flattened sides, as illustrated in Fig. 7 of the drawings.

The means 13 is provided to yieldingly urge the plug 11 downwardly of the opening 12 so that the plug 11 is normally retained in tight seating engagement with the walls of the opening. The means 13 is in the nature of spring means and includes a spring 36 arranged under compression between a nut 37 screw threaded on the stem 33 and a washer 38 slidably mounted on the base 34 of the core. The washer 38 is provided with a central opening 39 of the same shape as the base 34 and slidably passes the base. The washer 38 is therefore slidable on the base 34 but is held against rotation relative to the core. The washer 38 normally engages the lower end of the body 10 and is provided with an annular downwardly facing shoulder 40. The nut 37 is screw threaded on the stem 38 and is provided with an axially extending apron or flange 41 which is slidable on the exterior of the washer 38. The spring 36 seats in an annular recess 42 on the inner side of the nut 37 and is arranged under compression between the bottom of the recess 42 and the shoulder 40 of the washer 38. The outer or lower end of the nut 37 is preferably polygonal so as to be readily engaged by a wrench, or the like. With the construction just described, the spring 36 reacts against the nut 37 and body 10, through the washer 38 which is retained in engagement with the lower end of the body. The spring 36 thus acts to urge the plug 11 downwardly in the body.

The packing means 14 is provided to prevent the leakage of fluid through the plug opening 12. The packing means 14 may be embodied in either the body 10 or the plug 11. It is preferred, however, to provide the packing means 14 on the plug 11. The means 14 is in the nature of expansible packing means and is operated or expanded by pressure tending to leak longitudinally of the plug. Annular recesses or grooves 50 are provided on the exterior of the plug 11 between its upper end and the upper edge of the opening 32, and between the lower end of the plug 11 and the lower end of the opening 32. In practice, only two recesses 50 need to be provided in the plug, one in the upper portion of the plug and one in the lower portion of the plug. The outer walls of the grooves 50, that is, the walls furthest from the center of the plug 11, may be made flat or at right angles to the axis of the plug. The opposite or inner walls 51 of the groves 50 are tapered or beveled inward toward the center of the body. The bevel of the walls 51 is preferably slight. A section or body of packing 52 is arranged in each of the grooves 50 to cooperate with the walls of the opening 12. The packing 52 is preferably formed of resilient material such as, rubber, or the like. The packing 52 seats against the outer walls of the grooves 50 and against the bottoms of the grooves. The inner sides of the packing are provided with annular V-shaped grooves 55. The grooves 55 are adapted to receive fluid that may pass outwardly in the opening 12. It will be obvious how pressure exerted by fluid entering the grooves 55, will cause the packing 52 to be forced tightly against the walls of the opening 12 and in the recesses in the plug.

Means may be provided for lubricating the core. A plurality of grease connections 80 may be provided on the body to deliver grease, or other suitable lubricating material into the opening 12. In the particular case illustrated, there is a connection 80 adapted to discharge a lubricant into the opening 12 adjacent each of the packing rings 50. The connections 80 may be arranged adjacent a vertical rib 18.

It is believed that the practicability and utility of the present invention will be readily apparent from the foregoing detailed description. It is to be noted that all the parts of the device are of heavy and strong construction. The shield or flange 27, by extending outwardly over the upper end of the body 10, positively prevents any fluid that may leak from around the plug from discharging directly upward. Further, it is to be noted that the means 13, by normally urging the plug 11 into seating engagement in the opening 12, operates to prevent leakage around the plug 11. The nut 37 is formed with the flange 41 which protects the spring 36 as well as the washer 38. The nut 37 is also of heavy construction and protects the lower end of the plug 11 and the body 10. By turning the nut 37 the pressure exerted by the spring 36 may be adjusted as desired.

Having described only a typical preferred form of my invention I do not wish to limit myself to the specific details set forth, but wish to reserve to myself any changes or variations that may appear to those skilled in the art or fall within the scope of the following claims:

Having described my invention, I claim:

1. A stop cock including, a body having a fluid passage and a tapered transverse opening, a tapered plug in said opening operable to prevent the flow of fluid through the passage, reinforcing ribs on the body, and means yieldingly urging the plug into the opening including, a stem on the plug projecting from the body, a washer slidable on the stem and adapted to engage the body, a nut threaded onto the stem, and a spring arranged between the washer and nut, the nut being adapted to engage the washer.

2. A stop cock of the character described including, a body having a fluid passage and a tapered opening, a tapered plug in the opening having a transverse opening, the plug being operable to bring the transverse opening into and out of register with the fluid passage, the plug having annular grooves at opposite sides of the transverse opening, and rings of expansible packing in the grooves to seal with the walls of the tapered opening, there being annular grooves in the inner sides of the rings, the inner walls of the grooves in the plug being beveled to admit fluid into the grooves in the rings.

3. A stop cock of the character described including, a body having a fluid passage and a tapered opening, a tapered plug in the opening having a transverse opening, the plug being operable to bring the transverse opening into and out of register with the fluid passage, the plug having annular grooves at opposite sides of the transverse opening, rings of expansible packing in the grooves to seal with the walls of the tapered openings, there being grooves in the inner sides of the rings, the inner walls of the grooves in the plug being beveled to admit fluid into the grooves in the rings, and means for supplying lubricant under pressure to the tapered opening adjacent the inner edges of the grooves in the plug.

In witness that I claim the foregoing I have hereunto subscribed my name this 9th day of October, 1929.

LELAND S. HAMER.